United States Patent
Healy et al.

(10) Patent No.: US 12,456,066 B2
(45) Date of Patent: Oct. 28, 2025

(54) INTELLIGENT QUANTUM CIRCUIT GENERATION

(71) Applicant: Dell Products L.P., Round Rock, TX (US)

(72) Inventors: Brendan Burns Healy, Whitefish Bay, WI (US); Benjamin Edward Santaus, Somerville, MA (US)

(73) Assignee: DELL PRODUCTS L.P., Round Rock, TX (US)

( * ) Notice: Subject to any disclaimer, the term of this patent is extended or adjusted under 35 U.S.C. 154(b) by 671 days.

(21) Appl. No.: 17/901,947

(22) Filed: Sep. 2, 2022

(65) Prior Publication Data

US 2024/0078454 A1 Mar. 7, 2024

(51) Int. Cl.
*G06N 7/01* (2023.01)
*G06N 10/40* (2022.01)
*G06Q 10/047* (2023.01)

(52) U.S. Cl.
CPC .............. *G06N 7/01* (2023.01); *G06N 10/40* (2022.01); *G06Q 10/047* (2013.01)

(58) Field of Classification Search
CPC ......... G06N 7/01; G06N 10/40; G06Q 10/047
See application file for complete search history.

(56) References Cited

U.S. PATENT DOCUMENTS

| | | | |
|---|---|---|---|
| 9,858,531 B1 * | 1/2018 | Monroe | G06N 10/40 |
| 11,436,519 B1 * | 9/2022 | Dridi | G06N 20/00 |
| 11,526,795 B1 * | 12/2022 | McMahon | G06N 20/00 |
| 11,574,030 B1 * | 2/2023 | Harrigan | G06N 10/20 |
| 2021/0174237 A1 * | 6/2021 | Mentovich | G06F 13/4022 |
| 2021/0248489 A1 * | 8/2021 | Yarkoni | G06Q 10/047 |
| 2022/0101164 A1 * | 3/2022 | Majumdar | G06N 10/00 |
| 2022/0398293 A1 * | 12/2022 | Ohzeki | G06N 7/01 |
| 2023/0385676 A1 * | 11/2023 | Mentovich | G06N 10/60 |

OTHER PUBLICATIONS

Alberto Leporati and Sara Felloni, "Three Quantum Algorithms to Solve 3-SAT", Dipartimento di Informatica, Sistemistica e Comunicazione, Universit'a degli Studi di Milano (2007), Retrieved from <http://www.gcn.us.es/4BWMC/vol2/quantumnp.pdf>.
Qiskit.org., "Solving Satisfiability Problems using Grover's Algorithm", The Jupyter Book Community (2021), Retrieved from <https://qiskit.org/textbook/ch-applications/satisfiability-grover.html>.
Matthew W. Moskewicz et al., "Chaff: Engineering an Efficient SAT Solver", Princeton University (2005), Retrieved from <https://www.princeton.edu/~chaff/publication/DAC2001v56.pdf>.

* cited by examiner

*Primary Examiner* — David E Choi
(74) *Attorney, Agent, or Firm* — Chamberlain, Hrdlicka, White, Williams & Aughtry; Aly Z. Dossa

(57) ABSTRACT

A method for generating one or more quantum circuits to be evaluated by one or more QPUs is disclosed. The method includes obtaining a problem to be solved using one or more QPUs and analyzing the problem for reductions in complexity to obtain a reduced problem. One or more quantum algorithms are generated to implement a potential solution to the reduced problem, and the quantum algorithms are translated into one or more quantum circuits. The method further includes transmitting the one or more quantum circuits to the one or more QPUs.

20 Claims, 4 Drawing Sheets

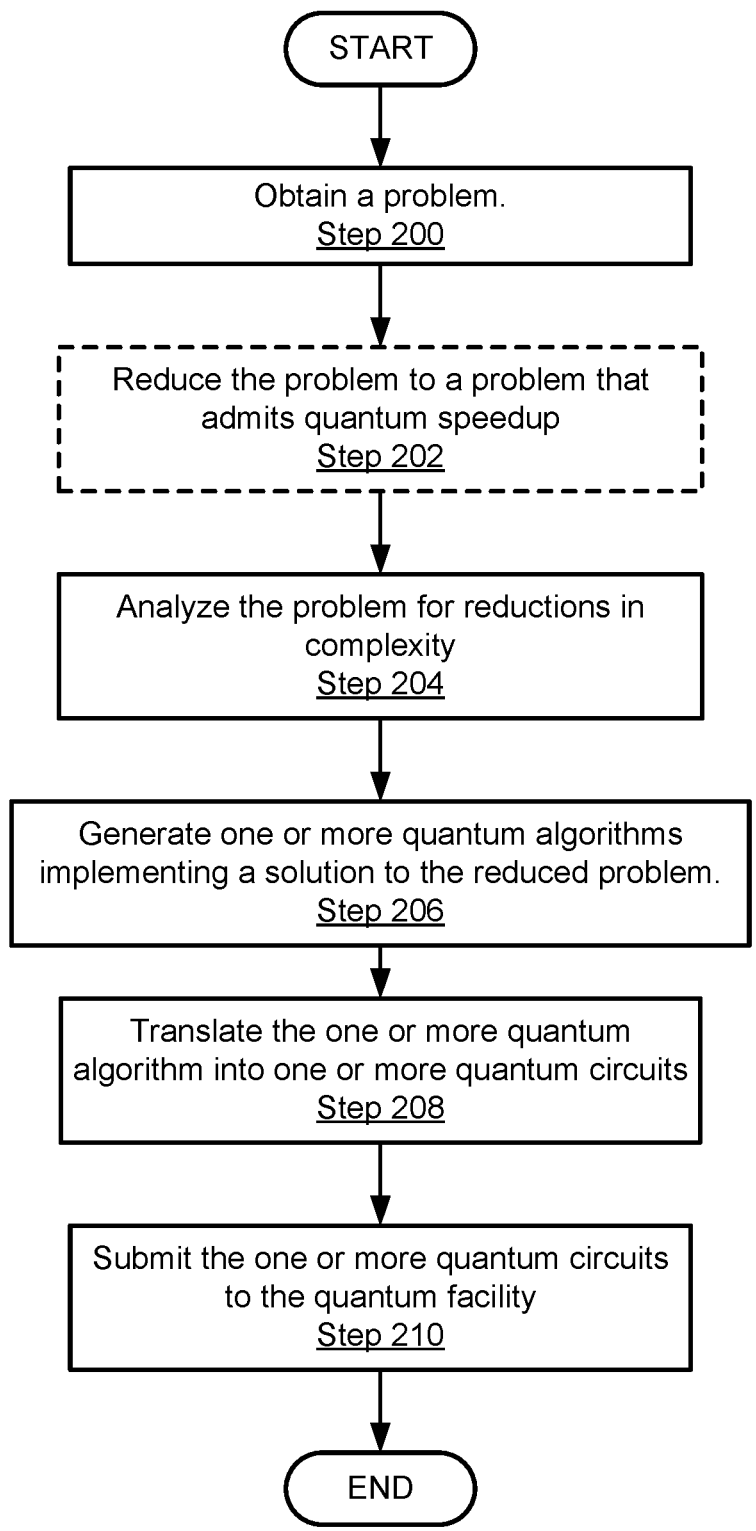
FIG. 2.1

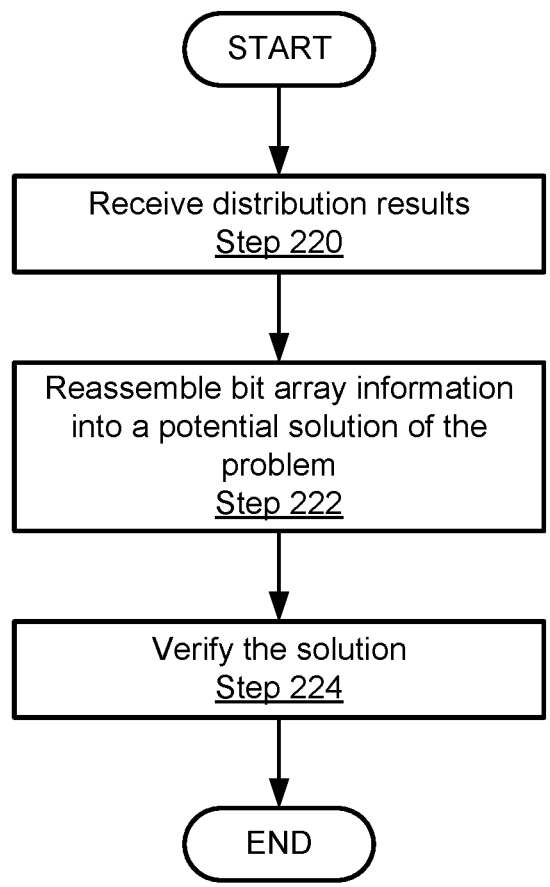
FIG. 2.2

INTELLIGENT QUANTUM CIRCUIT GENERATION

BACKGROUND

Quantum computing does not necessarily grant advantages over classical hardware. Currently, the use cases for quantum hardware are limited in scope; however, these use cases are expected to expand in the future. The functions that may be accelerated using quantum processing have the potential for astonishing improvements over classical algorithms.

Quantum Processing Units (QPUs) or quantum circuit simulators require very specialized inputs, in the form of quantum circuits, and return very specialized outputs, in the form of a sampling from a probability distribution over bit strings. While QPUs have the potential to accelerate highly specialized workloads, a significant amount of preparation is required to utilize a QPU. Further, the results often require interpretation before being useful to an end user. Although interfaces to QPUs exist, such interfaces typically do not perform significant pre-processing of the problem input.

SUMMARY

In one aspect, embodiments described herein relate to a method for generating one or more quantum circuits to be evaluated by one or more QPUs. The method includes obtaining a problem to be solved using one or more QPUs and analyzing the problem for reductions in complexity to obtain a reduced problem. One or more quantum algorithms are generated to implement a potential solution to the reduced problem, and the quantum algorithms are translated into one or more quantum circuits. The method further includes transmitting the one or more quantum circuits to the one or more QPUs.

In another aspect, embodiments described herein relate to a non-transitory computer readable medium storing instructions that when executed by a computer causes the computer to execute a method for generating one or more quantum circuits to be evaluated by one or more QPUs. The method includes obtaining a problem to be solved using one or more QPUs and analyzing the problem for reductions in complexity to obtain a reduced problem. The method includes generating one or more quantum algorithms to implement a potential solution to the reduced problem, and the quantum algorithms are translated into one or more quantum circuits. The method further includes transmitting the one or more quantum circuits to the one or more QPUs.

BRIEF DESCRIPTION OF DRAWINGS

Certain embodiments of the technology will be described with reference to the accompanying drawings. However, the accompanying drawings illustrate only certain aspects or implementations of the technology by way of example and are not meant to limit the scope of the claims.

FIGS. 2.1 and 2.2 show flow charts in accordance with one or more embodiments disclosed herein.

DETAILED DESCRIPTION

Figure 1:
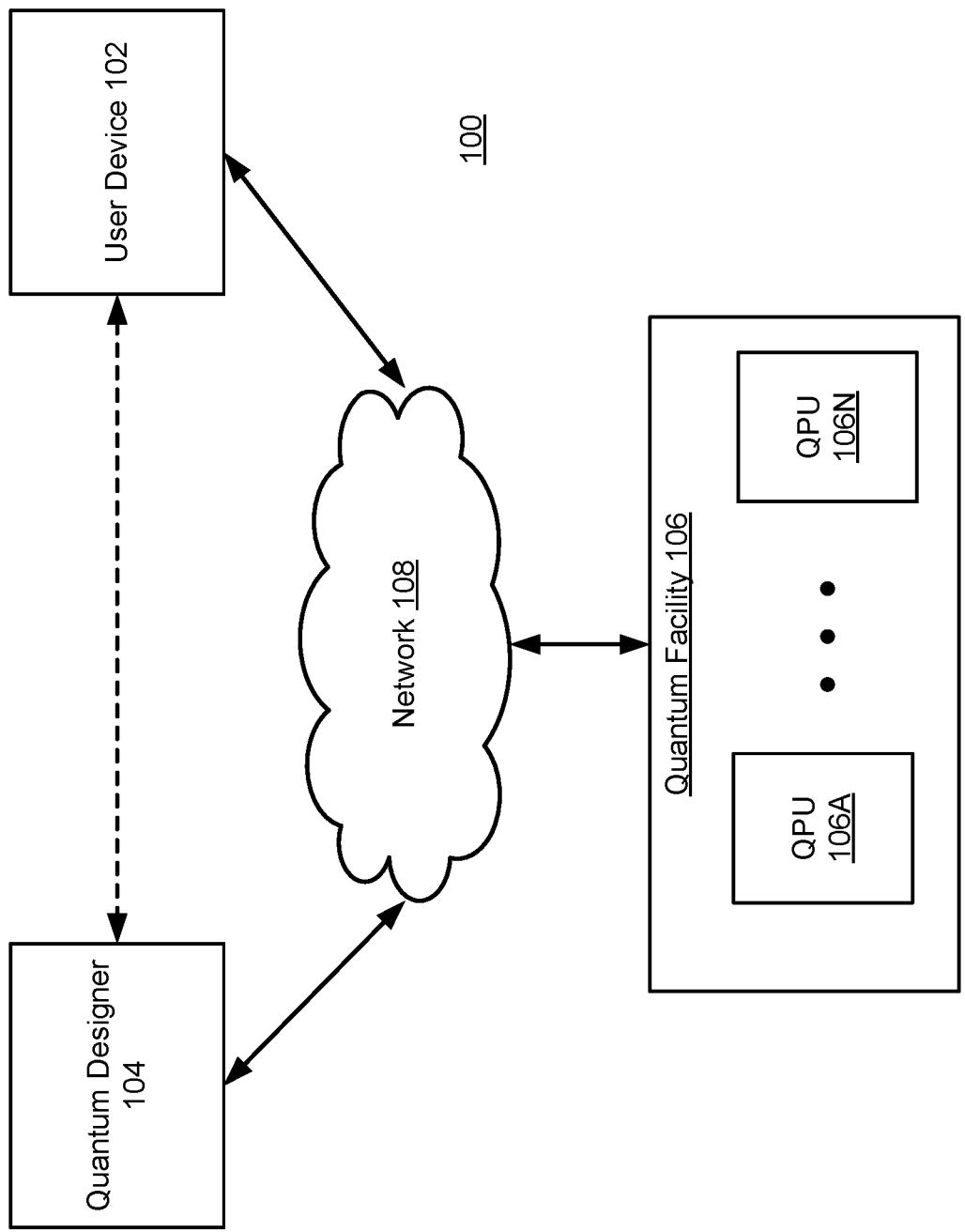
FIG. 1 shows a diagram of a system in accordance with one or more embodiments of the technology.

Specific embodiments will now be described with reference to the accompanying figures. In the following description, numerous details are set forth as examples of the technology. It will be understood by those skilled in the art that one or more embodiments of the present technology may be practiced without these specific details and that numerous variations or modifications may be possible without departing from the scope of the technology. Certain details known to those of ordinary skill in the art are omitted to avoid obscuring the description.

In the following description of the figures, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment, which may be implemented in addition to, in conjunction with, or in place of the embodiments described with regard to a corresponding like-named component in any other figure.

Herein, an algorithm, be it quantum or classical, consists of taking input data, performing some operations, and arriving at some output data. The steps of the algorithm may be defined as a collection of operations, often called gates. In classical algorithms and hardware, the data is in the form of bits with values of either 0 or 1. In quantum processing, the data is in the form of qubits. A qubit is a single piece of data, which may be realized as 0 or 1 when being interpreted as output, or occasionally, as a step in the algorithm. In contrast to a regular bit, the qubit is in a superposition of both 0 and 1 during processing in the circuit. For quantum computation, the superposition may be considered a probability distribution. That is, the superposition may be considered the likelihood of measuring 0 and the likelihood of measuring 1. Accordingly, quantum algorithms are inherently probabilistic, and quantum algorithms may give a variety of different outputs from a given input in contrast to classical algorithms.

To utilize quantum acceleration fully, it is advantageous for developers to take advantage of this indeterminacy. Accordingly, developing quantum circuits requires specialized insight in the operation of quantum hardware, which may be considered non-intuitive or even counter-intuitive to some end users. For example, while a set of instructions running on a (classical) fixed set of bits can only have a finite number of possible gates, when formulating quantum circuits, developers may choose from an infinite number of gates, even when considering execution with a single qubit. In general, a quantum circuit refers to a virtual construct that models a circuit that includes one or more QPUs to facilitate the processing using QPUs.

Currently, there are QPU facilities available to users. Such QPU facilities are typically quantum hardware executing a particular sequence of quantum gates with no other additional functionality. Although a round of problem simplification has been introduced to reduce the difficulty of the job in a cloud Function-as-a-Service (FaaS) environment, such simplifications are designed to optimize the throughput of the FaaS, rather than an optimization directed to utilizing the indeterminacy of the quantum processing. That is, current optimizations are determined after a quantum circuit has been generated (i.e., established), rather than determined before the quantum circuit is determined.

In general, embodiments of the technology relate to method, device, and system for optimizing quantum circuit design to enhance the utilization of quantum processing. Embodiments disclosed herein allow a user to provide the specification of a problem to be solved using a QPU and autonomously construct a corresponding quantum circuit. As such, it is not necessary for a user to have knowledge of quantum gates, but the user may still benefit from the advantages of using QPUs.

Embodiments disclosed herein determine efficiency improvements within an algorithm to provide a classical speedup to a quantum process. Embodiments use a hybrid approach of blending classical hardware with quantum processes to allow jobs that may be intractable by a classical or quantum system independently.

Embodiments disclosed herein provide speedup and simplification in the problem specification phase, prior to generating a quantum circuit. By performing one or more of the enclosed methods prior to quantum circuit generation, embodiments may allow processes to be run across multiple QPUs, or on a single QPU in a sequence, rather than requiring larger-qubit quantum machines.

FIG. 1 shows a diagram of a system in accordance with one or more embodiments of the technology. The system (100) includes a user device (102), a quantum designer (104), and a quantum facility (106). In embodiments disclosed herein, the user device (102), quantum designer (104), and quantum facility (106) may be connect by a network (108). In some embodiments, as shown by the dashed line in FIG. 1, the user device (102) may be directly connected to the quantum designer (104). One of ordinary skill in the art will appreciate that embodiments are not limited to the specific connections shown in FIG. 1. For example, one or more of the user device (102), quantum designer (104), and quantum facility (106) may be directly connected, or connected via a local network.

The user device (102) may be implemented as a computing device. The computing device may be, for example, embedded computing devices, mobile phones, tablet computers, laptop computers, desktop computers, servers, network devices, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application. The user device (102) may be other types of computing devices without departing from the technology. For additional details regarding computing devices, refer to FIG. 3.

The user device (102) may be a logical device without departing from the technology. For example, the user device (102) may be implemented as a virtual machine or other types of logical entities that utilize computing resources of any number of physical computing devices to provide the functionality of the user device (102). The user device (102) may be another type of logical device without departing from the technology.

The quantum designer (104) may be implemented as a computing device. The computing device may be, for example, embedded computing devices, mobile phones, tablet computers, laptop computers, desktop computers, servers, network devices, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIG. 2. The quantum designer (104) may be other types of computing devices without departing from the technology. For additional details regarding computing devices, refer to FIG. 3.

The quantum designer (104) may be a logical device without departing from the technology. For example, quantum designer (104) may be implemented as virtual machine or another type of logical entities that utilizes computing resources of any number of physical computing devices to provide the functionality of the quantum designer (104). The quantum designer (104) may be another type of logical device without departing from the technology.

The quantum facility (106) is an entity that includes quantum hardware, i.e., one or more QPUs or quantum circuit simulators (106A . . . 106N) to perform quantum processing in accordance with embodiments disclosed herein. The quantum facility (106) has the capabilities to execute a sequence of quantum gates using the one or more QPUs or quantum circuit simulators (106A . . . 106N). Embodiments disclosed herein are not limited to any particular sequence of quantum gates or any number of QPUs.

The network (108) may facilitate communications between the aforementioned devices. The network (108) may utilize any number of operable connections supported by any number and/or combination of wired and/or wireless networks to facilitate communications between the aforementioned devices.

FIG. 2.1 shows a flowchart of a method in accordance with one or more embodiments of the technology. The method depicted in FIG. 2.1 may be used to prepare a problem for a quantum facility (106) in accordance with one or more embodiments of the technology. The method shown in FIG. 2.1 may be performed by, for example, the quantum designer (104). Other components of the system illustrated in FIG. 1 may perform all, or a portion, of the methods of FIG. 2.1 without departing from the technology.

A problem is obtained in Step 200 in accordance with embodiments disclosed herein. In some embodiments, the problem may be simply stated. For example, the problem may be "what are the prime factors of this integer?" Such problems may include a key integral parameter. The problems may be considered non-deterministic non-polynomial (NP) problems with some satisfiability in accordance with embodiments disclosed herein.

The computational complexity of such problems may be evaluated based on how many steps or computations the problem requires as a function of the key integral parameter. In some embodiments, the computational complexity may be based on a highest growing factor that contributes to the problem as a function of the key integral parameter. In such embodiments, as the key integral parameter increases (potentially without bound), the highest growing factor may dominate the computational execution time. Such considerations may be important when considering scalability of the problem.

In Step 202, the problem may be reduced to a problem that benefits from quantum computational techniques. In some embodiments, although the initial problem may not be particularly suited for quantum accelerated computations, an equivalent problem that is suited for quantum accelerated computations may be determined.

For example, a combinatorial problem of interest that has the ability to model many issues that arise in various areas is whether a particular graph (e.g., a set of nodes connected by edges) admits a k-coloring. A k-coloring of a graph is an assignment of one of k "colors" such that no two adjacent nodes (nodes connected by an edge) share the same color. In practice, such "colors" may be described by natural numbers or capital letters.

Consider a graph consisting of a straight line with any number of nodes placed along the line. Such a graph may be considered two-colored with each node alternating colors. Further, a graph with n-vertices (i.e., n nodes where every possible pair of nodes has an edge between the pair of nodes) would require at least n colors.

In accordance with embodiments disclosed herein, such coloring problems may be reduced to a Boolean Satisfiability Problem (SAT). That is, a transformation exists that can reduce a k coloring problem into a SAT problem. Therefore, the encoding of the SAT into a quantum circuit also provides an avenue for encoding the colorability in accordance with embodiments disclosed herein. It is noted that Step 202 is optional and may not be required for some problems.

In Step 204, the problem is analyzed for reductions in complexity beneficial to the quantum process. Examples of reductions in complexity include, but are not limited to, eliminating one or more variables in the problem and/or dividing the problem into one or more small problems.

Further to the examples, a quantum calculation may require assigning qubits to variables. Therefore, a reduction number of variables translates into a reduction in the number of qubits needed for the QPU(s) to handle a generated circuit. Further, for larger problems, there may not exist a capable QPU to run the generated algorithm. Accordingly, embodiments disclosed herein have the ability to not only make using QPUs more efficient, but possible for larger problems.

Still further to the examples, breaking a problem into multiple pieces may have some benefit in a classical system. However, in a quantum execution, the number of qubit circuits to be executed heavily influences execution. As a specific example, the quantum execution of two 25-qubit circuits is exponentially more tractable than the execution of a single 50-qubit circuit. Accordingly, embodiments disclosed herein identify a beneficial simplification that may be implemented prior to circuit generation.

In some embodiments, one or more problems may be equivalent, i.e., problems may be capable of being reduced to each other, with varying levels of simplification. In certain embodiments, a speedup to reduce the problem to another problem may be performed, followed by performing a simplification or splitting, and then converting back. However, because the conversion may be considered polynomial, efficiency may be increased only when the efficiency gained from simplifying/splitting is significant. In embodiments where the problem is being reduced to make the quantum circuit encoding possible, easy simplifications from both before and after the conversion may be considered.

Although such reductions may be considered classical in nature, the reductions are designed to facilitate and enhance the quantum computation. Although some classical problem reductions prior to performing quantum computations have been considered, such reductions have previously been focused on optimizing throughput, rather than the indeterminacy of the quantum processing.

In Step 206, quantum algorithms are generated to implement a solution to the problem. This step may be achieved by accessing a library of quantum algorithms relative to the reduced problem in accordance with embodiments disclosed herein. The reductions of the problem may be coordinated with such libraries in accordance with embodiments disclosed herein. For example, a quantum Fredkin circuit may be used to compute a superposition of all classical evaluations of a solution in a given output line. Other algorithms may be used that compute a similar superposition on a given register of a quantum register machine (QRM) and/or compute the energy of a given membrane in a quantum P system.

As previously noted, a problem may be broken down into one or more sub-problems. In such embodiments, multiple quantum algorithms may be generated for the reduced problem in Step 206.

In Step 208, the quantum algorithm is translated into one or more quantum circuits. For example, a quantum Fredkin circuit and/or registers of a quantum register machine (QRM) may be used to convert the quantum algorithm into the appropriate quantum circuits.

In Step 210, the one or more quantum circuits are submitted to a quantum facility in accordance with embodiments disclosed herein. The quantum facility includes one or more QPUs used to evaluate the quantum circuits. Embodiments disclosed herein are not limited to any particular QPU facilities; however, one of ordinary skill in the art will appreciate that the characteristics of the specific QPU to be used to evaluate the quantum circuit may influence some of the steps presented herein.

FIG. 2.2 shows a flowchart of a method in accordance with one or more embodiments of the technology. The method depicted in FIG. 2.2 may be used to prepare a solution in accordance with one or more embodiments of the technology. The method shown in FIG. 2.2 may be performed by, for example, the quantum designer (104). Other components of the system illustrated in FIG. 1 may perform all, or a portion, of the methods of FIG. 2.2 without departing from the technology.

In Step 220, results are received from the one or more QPUs evaluating a submitted quantum circuit. In embodiments disclosed herein, the results are in the form of distribution, for example a bit array distribution correlated to the quantum circuit/job/cubit. It is noted, quantum circuits may require additional qubits, differentiated from qubits associated with the inputs and outputs. Such qubits are typically labeled "auxiliary." Results may include information associated with auxiliary qubits associated with the QPU evaluation.

In Step 222, the results are reassembled into one or more potential solutions to the problem. As noted, the results received may be in the form of a sampling from a probability distribution of bit arrays. For example, for jobs that run on 4 qubits, a potential output that reads 0110:13, 1001:16, 1010:3. In this context, 0110, 1001, and 1010 represent the 4 qubits and 13, 16, and 3 represent the number of times the qubit was measured. More specifically, the combination 0110 (qubit 1 measured as 0, qubit 2 measured as 1, qubit 3 measured as one, and qubit 4 measured as zero) was measured 13 times.

Continuing the example, from this data, or from a frequency report, the quantum circuit was executed 32 times. The number of times the circuit is evaluated is often referred to as "shots." In general, the greater the number of shots, the more accurate the execution of the quantum circuit. If more than one viable solution exists, a quantum output will be distributed statistically across the solutions. In such cases, a high number of shots is recommended to minimize noise relative to the potential solutions. Such quantum noise is known to be inherent to current implementations of QPUs, and currently, such noise may not be reliably eliminated.

From the distributions, a clearly dominant outcome may be established in accordance with embodiments disclosed herein. The dominant outcome likely represents a solution to some or all of a problem. Such dominant outcomes are part of the information presented with solution packages that may be passed to a user. That is, embodiments disclosed herein may optionally strip away any quantum noise associated with incorrect solutions when presenting solutions and solution packages.

In Step 224, the solution is verified in accordance with embodiments disclosed herein. In embodiments, the solution, or one or more potential solutions, may be evaluated using the problem in order to verify the solution. In some embodiments, potential solutions may be evaluated using any previous parts or iterations of the problem used when performing the embodiments of FIG. 2.1.

Embodiments disclosed herein include reducing problems. In such embodiments, results from the QPUs would have to be converted into a solution to the original problem. Accordingly, embodiments may save the necessary information of any conversions, for example, in in memory or storage for the duration of evaluations by the QPU(s).

In embodiments where the problem has been split, reversing the process is necessary. In such embodiments, the solutions to the split problems may require some reconciliation when being combined. For example, potential solutions may require verifications in one or more of the split problems to form potential solutions to the (entire) problem.

Embodiments disclosed herein may provide solutions to a user. Such solutions may include potential solutions predicted by the QPU, solutions that have been verified, and solutions formatted to match any functions called by the user. In some embodiments, a user may be capable of examination of the received results, and pick out one or more distributions believed to be potential solutions.

The following are specific examples that demonstrate the versatility of one or more embodiments disclosed herein. The examples are not intended to limit the scope of the technology.

To facilitate the examples, a Boolean Satisfiability Problem (referred to as a SAT) is described. In SAT, there are a set number of variables, usually labeled $\{x_1, \ldots x_n\}$ which take on either the value TRUE or FALSE. An example problem would be, given a set of clauses (e.g., $x_1 \wedge \neg x_2 \vee x_3$) each of which invokes k distinct variables, negated or not, being combined with AND or OR. Clauses that have k variables, are often referred to as k-SAT. An example solution to a SAT problem is an assignment of TRUE or FALSE to each variable ($x_1$) such that all clauses evaluate to TRUE. SAT may be particularly suited to quantum evaluations because qubits may represent variables that can simultaneously explore the search space of being either TRUE or FALSE.

Proceeding with examples, consider the problem of whether a particular graph (e.g., set of nodes connected by edges) uses k-coloring. A k-coloring of a graph is an assignment of one of k "colors" (e.g., natural numbers, capital letters) in a manner that no two adjacent nodes (i.e., nodes connected by an edge) share the same color. To illustrate, a graph consisting of a straight line with any number of nodes placed along it would be considered two-colored, by simply coloring each node alternating colors starting from one end. Further, a complete graph on n-vertices (i.e., n nodes where every possible pair of nodes has an edge between them) would require at least n colors to fill in properly.

Reducing k-coloring problems to SAT problems is possible. Therefore, embodiments disclosed herein may algorithmically encode an SAT problem into a quantum circuit, to solve problems related to the encoding of colorability.

Similar patterns exist to other problems. For example, a traveling salesman problem may be decomposable as two disjoint graphs separated by a pair of edges (provided the conditions are amenable). Accordingly, smaller traveling salesman problems may be solved on subgraphs, reducing the maximum qubit requirement for quantum acceleration. A traveling salesman problem is an example of a problem that may not be considered for quantum acceleration without the use of embodiments disclosed herein.

As a specific SAT example, a problem of satisfiability over the variables $\{x_1, x_2, x_3, x_4\}$ required to satisfy the following clauses:

$$x_1 \vee \neg x_2 \vee x_3 \tag{1}$$

$$x_2 \vee x_4 \wedge x_3 \tag{2}$$

Such a problems may be reduced by observing (i.e., detecting) that $x_1$ only appears in the clause (1); and assigning TRUE to $x_1$ satisfies clause (1). Accordingly, the problem may be reduced by setting $x_1$=TRUE and evaluating a solution to clause ($x_2 \vee x_4 \wedge x_3$) using the variables $\{x_2, x_3, x_4\}$. Because a quantum SAT solution involves assigning qubits to variables, the reduction in the number of variables translates into a reduction in the number of qubits needed for a QPU to evaluate the circuit. In some cases, reducing the number of qubits required may make the quantum calculations possible. Current quantum computing has no such ability to realize such reductions.

Continuing the examples, consider a five variable SAT problem that requires the following clauses:

$$x_1 \vee \neg x_2 \vee x_3 \tag{3}$$

$$\neg x_1 \vee x_2 \wedge \neg x_3 \tag{4}$$

$$x_3 \vee \neg x_4 \vee x_5 \tag{5}$$

$$\neg x_3 \vee x_4 \wedge \neg x_5 \tag{6}$$

In this example, it is observed (i.e., detected) that the clauses (3) and (4) may be considered a three variable SAT problem in the variables $\{x_1, x_2, x_3\}$. Further, it is observed that clauses (5) and (6) may be considered a three variable SAT problem in the variables $\{x_3, x_4, x_5\}$. Accordingly, separating the problem into two smaller problems requires fewer qubits per problem to be evaluated.

Continuing this example, the results received from the QPU evaluation would be reassembled to get a complete solution. Specifically, any pair of solutions that have agreeing assignments for $x_3$ would be considered a potential solution.

To further illustrate, a three variable SAT problem using $\{x_1, x_2, x_3\}$ with the single clause ($x_1 \wedge \neg x_2 \wedge x_3$) is considered. A result received to evaluating the associated quantum circuit 16 times is 101: 14, 100: 1, 011: 1. Recall, 101, 100, and 011 represent the 3 qubits and 14, 1, and 1 represent the number of times the qubit was measured. In this example, the dominant outcome represents the solution $x_1$=TRUE, $x_2$=FALSE, $x_3$=TRUE. Embodiments disclosed herein strip away the noise of the two incorrect solutions, which are a product of noise inherent to current QPUs. One of skill will recognize how the number of evaluations, or shots, may contribute to obtaining and recognizing a dominant outcome.

In the above examples, the instances of $\{x_1\}$ with the solutions TRUE/FALSE may be checked using the clauses to verify that the clauses are true. Further, solutions to a sequence of smaller SAT problems likely need to be checked to determine if different solutions received are reconcilable into a complete solution. In the SAT problem, literal TRUE/FALSE values may be put together, if possible, to form complete solutions to the entire problem.

Figure 3:
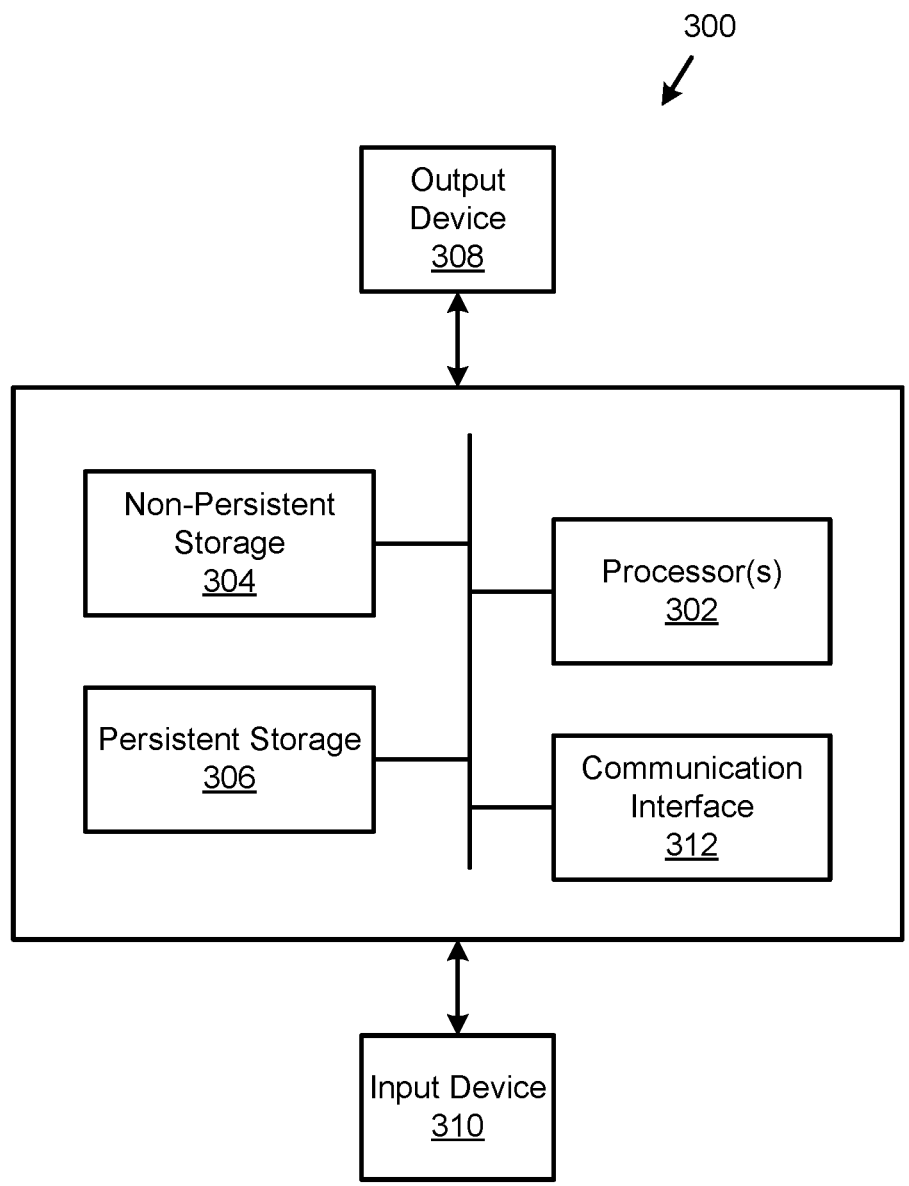
FIG. 3 shows a diagram of a computing device in accordance with one or more embodiments of the technology.

As discussed above, embodiments of the technology may be implemented using computing devices. FIG. 3 shows a diagram of a computing device in accordance with one or more embodiments of the technology. The computing device (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the technology, the computer processor(s) (302) may be an integrated circuit for processing instructions. For example, the computer processor(s) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (not shown) (e.g., a local area network (LAN), a wide area network (WAN) such as the Internet, mobile network, or any other type of network) and/or to another device, such as another computing device.

In one embodiment of the technology, the computing device (300) may include one or more output devices (308), such as a screen (e.g., a liquid crystal display (LCD), plasma display, touchscreen, cathode ray tube (CRT) monitor, projector, or other display device), printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

Embodiments of the technology may provide a user the ability to access quantum computing that constructs quantum circuits, sends the quantum circuits to an appropriate QPU, and returns a solution to the original problem. Embodiments may also improve the overall efficiency of computations employing quantum acceleration by engineering classical considerations for the performance of quantum processing. Embodiments may also have the advantage of considering problems that may not be conducive to quantum acceleration, such as an NP problem being reduced to an SAT problem.

The problems discussed above should be understood as being examples of problems solved by embodiments of the technology disclosed herein and the technology should not be limited to solving the same/similar problems. The disclosed technology is broadly applicable to address a range of problems beyond those discussed herein.

One or more embodiments of the technology may be implemented using instructions executed by one or more processors of the data management device. Further, such instructions may correspond to computer readable instructions that are stored on one or more non-transitory computer readable mediums.

While the technology has been described above with respect to a limited number of embodiments, those skilled in the art, having the benefit of this disclosure, will appreciate that other embodiments can be devised which do not depart from the scope of the technology as disclosed herein. Accordingly, the scope of the technology should be limited only by the attached claims.

What is claimed is:

1. A method for generating one or more quantum circuits, the method comprising:
   obtaining a problem to be solved using one or more quantum processing units (QPUs);
   analyzing the problem for reductions in complexity to obtain a reduced problem;
   generating one or more quantum algorithms implementing a potential solution to the reduced problem;
   translating the one or more quantum algorithms into the one or more quantum circuits; and
   transmitting the one or more quantum circuits to the one or more QPUs.

2. The method of claim 1, further comprising:
   reducing the problem to a problem solvable using one or more QPUs prior to analyzing the problem.

3. The method of claim 2, wherein the problem is a k-coloring of a graph.

4. The method of claim 2, wherein the problem is a traveling salesman problem.

5. The method of claim 1, wherein the reduced problem is a Boolean Satisfiability Problem (SAT).

6. The method of claim 1, wherein analyzing the problem comprises determining that the number of variables in the problem may be reduced, the method further comprising:
   reducing the number of variables in the problem to obtain the reduced problem.

7. The method of claim 6, the method further comprising:
   after analyzing the distribution and prior to verifying the one or more potential solutions, reassembling the one or more of the potential solutions based on the variables reduced.

8. The method of claim 1, wherein analyzing the problem comprises determining that the problem can be divided into sub-problems, the method further comprising:
   dividing the problem into two or more sub-problems to obtain the reduced problem.

9. The method of claim 8, the method further comprising:
   after analyzing the distribution and prior to verifying the one or more potential solutions, reassembling the one or more potential solutions based on the division of the problem into sub-problems.

10. The method of claim 1, further comprising:
    after transmitting the one or more quantum circuits, receiving a distribution of results;
    analyzing the distribution to determine one or more potential solutions; and
    verifying the one or more potential solutions to the problem to obtain a solution.

11. A non-transitory computer readable medium (CRM) storing instructions that when executed by a computer causes the computer to execute a method for generating one or more quantum circuits, the method comprising:
    obtaining a problem to be solved using one or more quantum processing units (QPUs);

analyzing the problem for reductions in complexity to obtain a reduced problem;

generating one or more quantum algorithms implementing a potential solution to the reduced problem;

translating the one or more quantum algorithms into the one or more quantum circuits; and transmitting the one or more quantum circuits to the one or more QPUs.

12. The non-transitory CRM of claim 11, further comprising:

reducing the problem to a problem solvable using one or more QPUs prior to analyzing the problem.

13. The non-transitory CRM of claim 12, wherein the problem is a k-coloring of a graph.

14. The non-transitory CRM of claim 12, wherein the problem is a traveling salesman problem.

15. The non-transitory CRM of claim 11, wherein the reduced problem is a Boolean Satisfiability Problem (SAT).

16. The non-transitory CRM of claim 11, wherein analyzing the problem comprises determining that the number of variables in the problem may be reduced, the method further comprising:

reducing the number of variables in the problem to obtain the reduced problem.

17. The non-transitory CRM of claim 16, the method further comprising:

after analyzing the distribution and prior to verifying the one or more potential solutions, reassembling the one or more of the potential solutions based on the variables reduced.

18. The non-transitory CRM of claim 11, wherein analyzing the problem comprises determining that the problem can be divided into sub-problems, the method further comprising:

dividing the problem into two or more sub-problems to obtain the reduced problem.

19. The non-transitory CRM of claim 18, the method further comprising:

after analyzing the distribution and prior to verifying the one or more potential solutions, reassembling the one or more of the potential solutions based on the division of the problem into sub-problems.

20. The non-transitory CRM of claim 11, further comprising:

after transmitting the one or more quantum circuits, receiving a distribution of results;

analyzing the distribution to determine one or more potential solutions; and verifying the one or more potential solutions to the problem to obtain a solution.

* * * * *